United States Patent
Shaner et al.

(10) Patent No.: US 11,535,390 B2
(45) Date of Patent: Dec. 27, 2022

(54) STRUCTURAL PANEL WITH INTEGRATED COUPLER

(71) Applicant: Rohr, Inc., Chula Vista, CA (US)

(72) Inventors: Kristopher B. Shaner, San Diego, CA (US); Thomas Sommer, San Diego, CA (US); Joseph R. Lundin, New Braunfels, TX (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/060,964

(22) Filed: Oct. 1, 2020

(65) Prior Publication Data

US 2021/0269168 A1 Sep. 2, 2021

Related U.S. Application Data

(60) Provisional application No. 62/983,239, filed on Feb. 28, 2020.

(51) Int. Cl.
| | | |
|---|---|---|
| *B64D 29/08* | (2006.01) | |
| *B64D 29/06* | (2006.01) | |
| *F02K 1/82* | (2006.01) | |
| *F02K 1/80* | (2006.01) | |
| *B32B 3/12* | (2006.01) | |

(52) U.S. Cl.
CPC ............... *B64D 29/08* (2013.01); *B32B 3/12* (2013.01); *B64D 29/06* (2013.01); *F02K 1/805* (2013.01); *F02K 1/82* (2013.01); *F02K 1/827* (2013.01); *B32B 2305/024* (2013.01); *B32B 2605/18* (2013.01); *F02K 1/80* (2013.01); *F05D 2250/283* (2013.01)

(58) Field of Classification Search
CPC .......... B64D 29/06; B64D 29/08; F02K 1/80; F02K 1/805; F02K 1/827; F02K 1/82
See application file for complete search history.

(56) References Cited

U.S. PATENT DOCUMENTS 3,061,349 A * 10/1962 Dellith ................... B64D 29/06
292/304
4,132,069 A * 1/1979 Adamson ............... B64D 29/00
244/54

(Continued)

FOREIGN PATENT DOCUMENTS

EP 2781728 A2 9/2014

OTHER PUBLICATIONS

Dulieu-Barton et al. "Effect of Core Crush on Honeycomb Sandwich Panels", Jun. 1, 2010, pp. 1-10, http://eprints.soton.ac.uk/159417/1/paper_icss9_word_3.pdf, retrieved on Jun. 28, 2021.

(Continued)

*Primary Examiner* — Andrew H Nguyen
(74) *Attorney, Agent, or Firm* — Getz Balich LLC

(57) ABSTRACT

An assembly is provided for an aircraft propulsion system. This assembly includes a cowl door movable between a closed position and an open position. The cowl door includes a structural panel and a mount. The structural panel includes an inner skin, an outer skin and a cellular core. The cellular core is connected to and arranged between the inner skin and the outer skin. The mount includes a base and a coupler. The base is connected to and arranged between the inner skin and the outer skin. The coupler projects out from the base.

16 Claims, 10 Drawing Sheets

(56) References Cited

U.S. PATENT DOCUMENTS

| | | | | |
|---|---|---|---|---|
| 4,509,616 | A | * | 4/1985 | Blecherman .............. F02K 1/80 |
| | | | | 428/116 |
| 4,534,167 | A | * | 8/1985 | Chee ...................... B64D 29/06 |
| | | | | 415/119 |
| 4,826,106 | A | * | 5/1989 | Anderson ................. F02K 1/82 |
| | | | | 428/116 |
| 5,101,621 | A | | 4/1992 | Mutch |
| 5,157,915 | A | * | 10/1992 | Bart ...................... F01D 25/243 |
| | | | | 244/54 |
| 5,603,471 | A | | 2/1997 | Armstrong |
| 6,123,170 | A | | 9/2000 | Porte |
| 6,375,121 | B1 | | 4/2002 | Porte |
| 9,897,007 | B2 | | 2/2018 | Soria |
| 10,247,021 | B2 | | 4/2019 | Strutt |
| 10,507,931 | B2 | | 12/2019 | Soria |
| 2004/0163883 | A1 | | 8/2004 | Suzuki |
| 2010/0143143 | A1 | | 6/2010 | Judge |
| 2010/0260602 | A1 | | 10/2010 | Binks |
| 2012/0308379 | A1 | | 12/2012 | Scarr |
| 2014/0077031 | A1 | | 3/2014 | Benedetti |
| 2015/0041059 | A1 | | 2/2015 | Olson |
| 2018/0155042 | A1 | | 6/2018 | Labelle |

OTHER PUBLICATIONS

Hsiao et al. "Core Crush Problem in the Manufacturing of Composite Sandwich Structures: Mechanisms and Solutions", AIAA Journal, vol. 44, No. 4, Apr. 1, 2006, pp. 901-907.

Meo et al. "The Response of Honeycomb Sandwich Panels Under Low-Velocity Impact Loading," International Journal of Mechanical Sciences, vol. 47, No. 9, Sep. 1 2005, pp. 1301-1325.

EP search report for EP21159759.6 dated Jul. 9, 2021.

* cited by examiner

STRUCTURAL PANEL WITH INTEGRATED COUPLER

CROSS-REFERENCE TO RELATED APPLICATIONS

This application claims priority to U.S. Provisional Patent Application No. 62/983,239 filed Feb. 28, 2020, which is hereby incorporated herein by reference in its entirety.

BACKGROUND

1. Technical Field

This disclosure relates generally to structural panels and, more particularly, to removably coupling a structural panel to another body.

2. Background Information

A modern aircraft propulsion system includes a gas turbine engine housed within a nacelle. The nacelle may include cowl doors to provide access to various components configured with the gas turbine engine. Various types and configurations of cowl doors are known in the art. Furthermore, various techniques are known in the art for removably coupling those cowl doors to a fixed structure. While these known cowl doors and coupling techniques have various benefits, there is still room in the art for improvement.

There is a need in the art for improved cowl doors and cowl door coupling assemblies.

SUMMARY OF THE DISCLOSURE

According to an aspect of the present disclosure, an assembly is provided for an aircraft propulsion system. This aircraft propulsion system assembly includes a cowl door movable between a closed position and an open position. The cowl door includes a structural panel and a mount. The structural panel includes an inner skin, an outer skin and a cellular core. The cellular core is connected to and arranged between the inner skin and the outer skin. The mount includes a base and a coupler. The base is connected to and arranged between the inner skin and the outer skin. The coupler projects out from the base.

According to another aspect of the present disclosure, a cowl door is provided for an aircraft propulsion system. This cowl door includes a first skin, a second skin, a cellular core and a mount. The cellular core is between and connected to the first skin and the second skin. The mount includes a base and a coupler. The base is next to the cellular core. The base is between and connected to the first skin and the second skin. The coupler projects out from the base at an end of the cowl door. The coupler is configured to mate with a receptacle in another structure of the aircraft propulsion system.

According to still another aspect of the present disclosure, a structure is provided for an aircraft propulsion system. This aircraft propulsion system structure includes a first skin, a second skin, a cellular core and a mount. The cellular core is between and connected to the first skin and the second skin. The mount includes a base and a coupler. The base is adjacent the cellular core. The base is between the first skin and the second skin. The base is liquid interface diffusion (LID) bonded to the first skin and/or the second skin. The coupler projects out from the base at an end of the structure.

The cellular core may be bonded to the inner skin and/or the outer skin.

The cellular core may be configured as or otherwise include a honeycomb core.

The cellular core may be a first cellular core. The structural panel may also include a second cellular core connected to and arranged between the inner skin and the outer skin. The first cellular core may be arranged between and/or may be abutted against the second cellular core and the mount.

The first cellular core may have a first density. The second cellular core may have a second density that is different than (or equal to) the first density.

The structural panel may also include an inner reinforcement sheet and/or an outer reinforcement sheet. The inner reinforcement sheet may be bonded to and/or arranged between the cellular core and the inner skin. The outer reinforcement sheet may be bonded to and/or arranged between the cellular core and the outer skin.

The structural panel may be configured from or otherwise include metal.

The coupler may be configured as or otherwise include an arcuate V-blade.

The coupler may be positioned at an axial end of the cowl door. The coupler may project radially inward from the base and away from the inner skin.

A turbine engine case may be included. The turbine engine case may be configured with a receptacle. The coupler may be configured to project into and mate with the receptacle when the cowl door is in the closed position.

A seal element may be included. The seal element may be attached to the base and configured to press against the turbine engine case.

A reinforcement sheet may be included. The reinforcement sheet may be bonded to and arranged between the base and the inner skin or the outer skin.

The reinforcement sheet may be bonded to the cellular core.

The mount may be configured as a monolithic body.

The mount may be configured as or otherwise include metal.

The mount may be bonded to the inner skin and/or the outer skin.

The base may have a generally U-shaped cross-sectional geometry.

The base may include an inner flange, an outer flange and a web. The web may extend between and/or may be connected to the inner flange and the outer flange. The inner flange may be overlapped by and/or connected to the inner skin. The outer flange may be overlapped by and/or connected to the outer skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
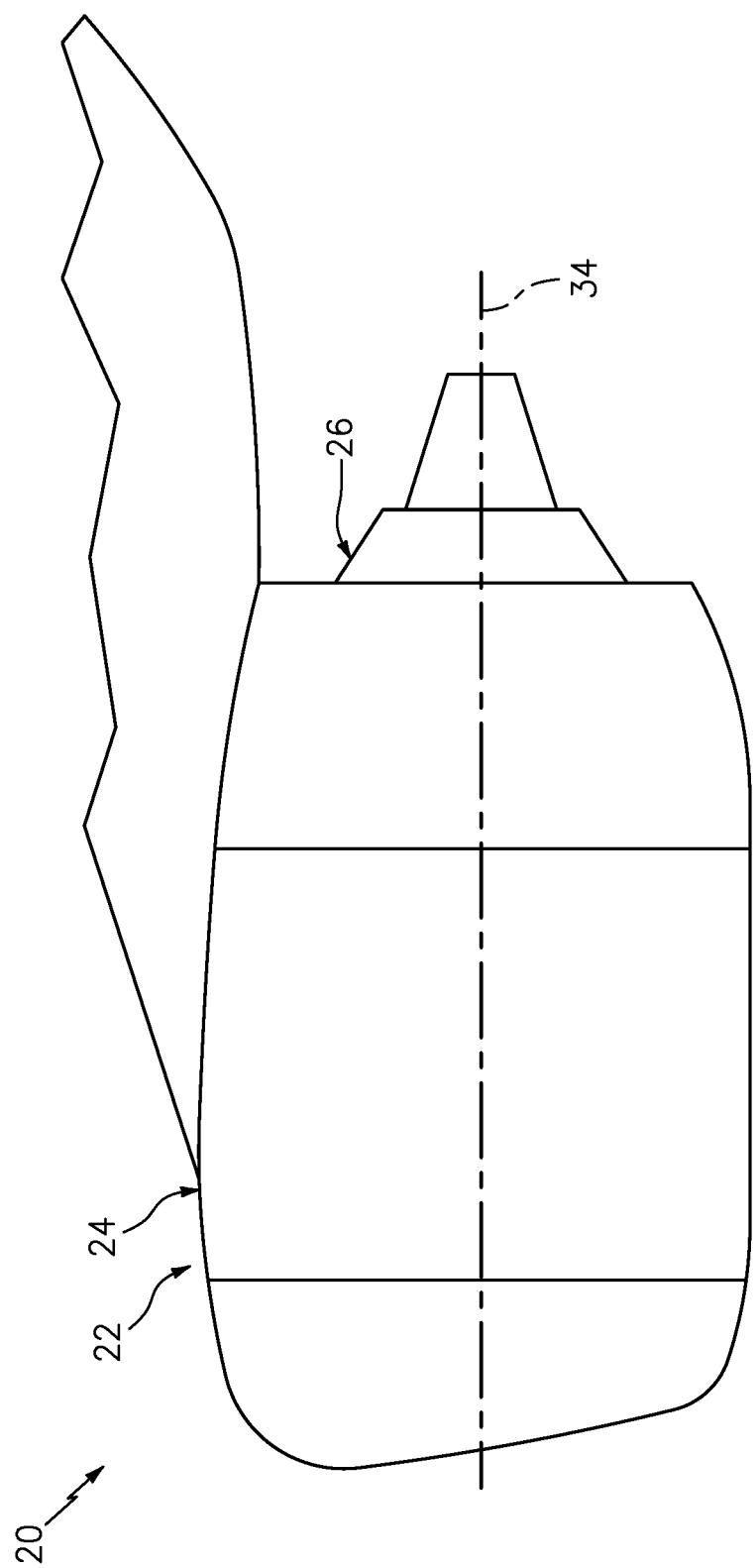
FIG. 1 is a side illustration of an aircraft propulsion system.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 of FIG. 1 includes a nacelle outer structure 24 and a nacelle inner structure 26, which inner structure 26 may sometimes be referred to as an inner fixed structure (IFS).

Figure 2:
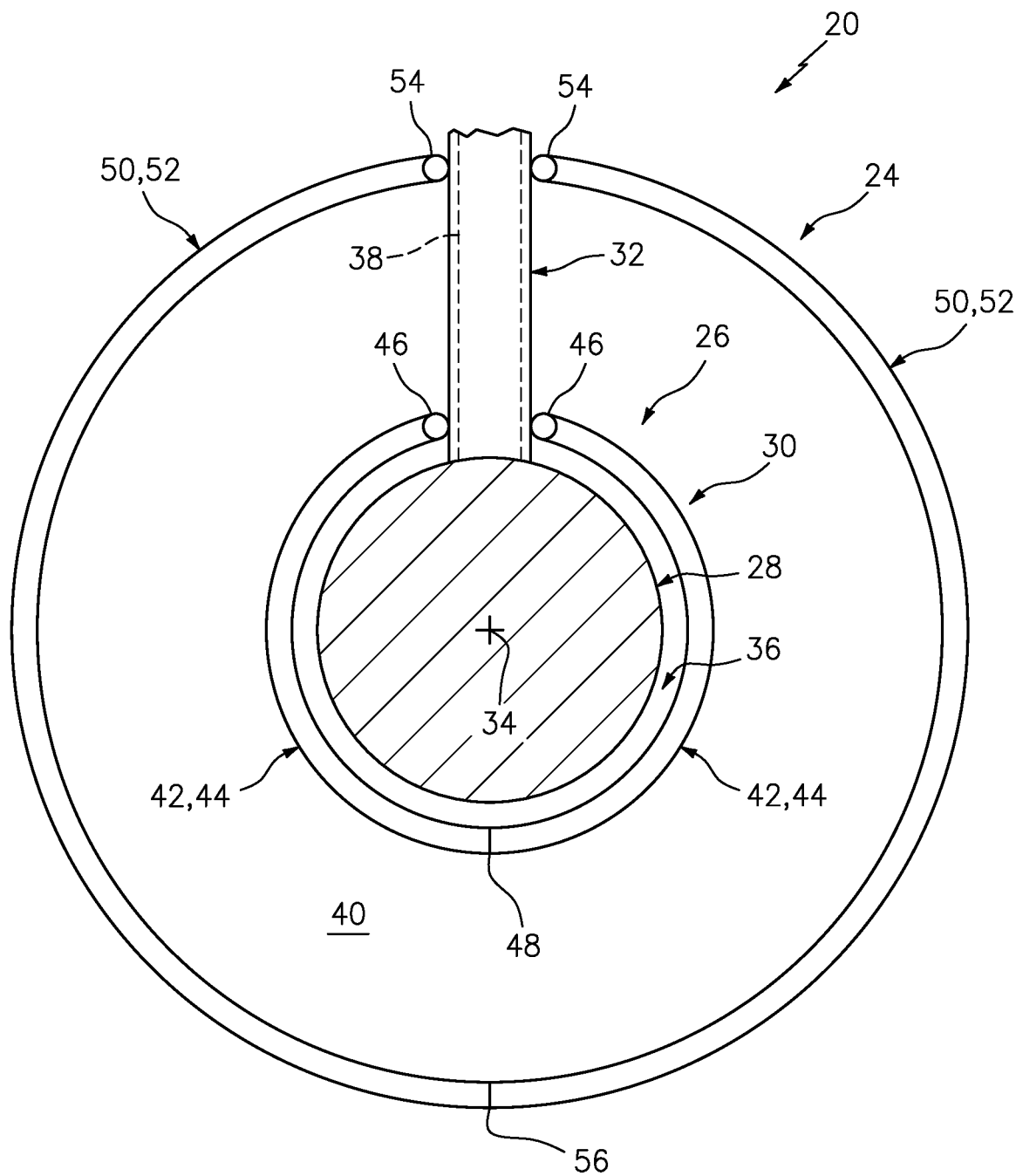
FIG. 2 is a cross-sectional illustration of a portion of the aircraft propulsion system with inner and outer cowl doors in closed positions.

Referring to FIG. 2, the inner structure 26 covers at least an axial portion (or an entirety) of a core 28 of the gas turbine engine, which engine core 28 may include a compressor section, a combustor section and a turbine section. The inner structure 26 includes an inner barrel 30 and at least one bifurcation structure 32; e.g., an upper bifurcation cowl. The inner barrel 30 may be a generally cylindrical/barrel-shaped cowl that extends circumferentially around and axially along the engine core 28 and an axial centerline 34 (e.g., rotational axis) of the aircraft propulsion system 20. The inner barrel 30 at least partially forms an internal compartment 36 (e.g., a core compartment) within the nacelle 22. This internal compartment 36 at least partially or completely houses the engine core 28; e.g., the engine core 28 is arranged within the internal compartment 36. The bifurcation structure 32 provides an aerodynamic housing for a pylon 38 which mounts the aircraft propulsion system 20 to the aircraft. The bifurcation structure 32 extends radially between the inner barrel 30 and the outer structure 24.

The outer structure 24 covers a fan section (not shown) of the gas turbine engine. The outer structure 24 covers at least a forward portion of the inner structure 26 and its inner barrel 30 so as to form a bypass duct and an associated bypass flowpath 40 radially between the structures 24 and 26. The outer structure 24 may also be configured with a thrust reverser (not shown) for redirecting airflow from the bypass flowpath 40 out of the nacelle 22 in a forward and/or outward direction. The present disclosure, however, is not limited to the foregoing exemplary general nacelle configuration.

Briefly, the bypass duct of FIG. 2 is configured as an O-Duct. The term "O-duct" may describe a duct through which only a single bifurcation extends between and connects a nacelle outer structure and a nacelle inner structure. By contrast, the term "C-Duct" or "D-duct" may describe a duct through which two bifurcations (e.g., an upper bifurcation and a lower bifurcation) extend between and connect a nacelle outer structure and a nacelle inner structure. Of course, although the exemplary duct shown in FIG. 2 is an O-duct, the present disclosure is not limited to any particular duct configurations. In particular, the present disclosure also contemplates the nacelle 22 having a C-duct or a D-duct.

Figure 3:
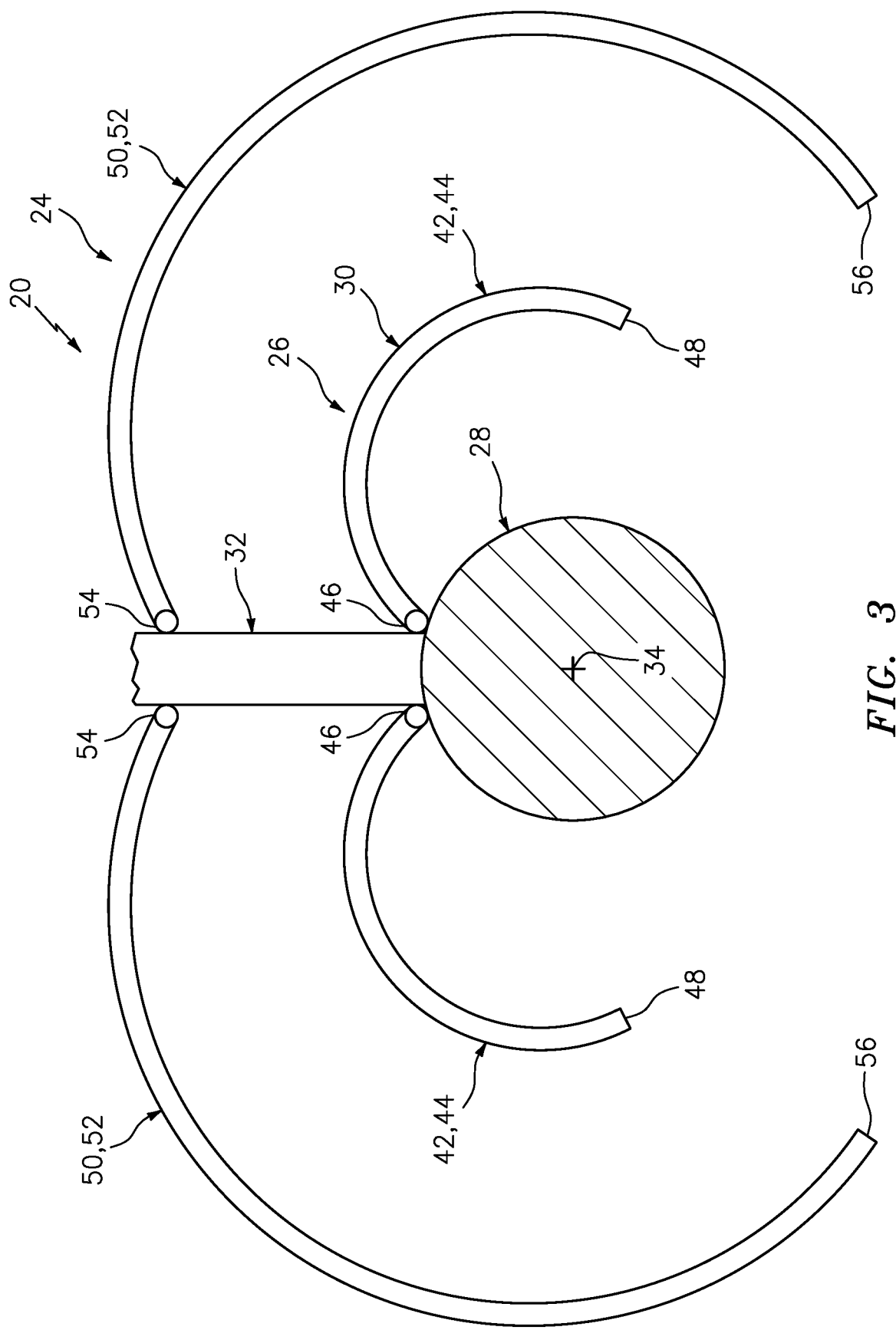
FIG. 3 is a cross-sectional illustration of a portion of the aircraft propulsion system with the inner and the outer cowl doors in open positions.

Referring still to FIG. 2, the inner structure 26 may be configured with one or more movable (e.g., pivotable) inner structure components 42. These inner structure components 42 may be configured as or otherwise include inner cowl doors 44. Each of these inner cowl doors 44 extends circumferentially about the centerline 34 and the engine core 28. In particular, each inner cowl door 44 extends circumferentially between an inner cowl upper end 46 and an inner cowl lower end 48. The inner cowl upper end 46 may be pivotally connected to the bifurcation structure 32 and/or the pylon 38 by, for example, one or more hinges. Each inner cowl door 44 is thereby operable to move (e.g., pivot) between a closed position (position of FIG. 2) and an open position (position of FIG. 3). Referring again to FIG. 2, the inner cowl lower ends 48 of the inner cowl doors 44 may be configured to latch together via one or more latches so as to at least partially or completely form the inner barrel 30.

The outer structure 24 may be configured with one or more movable (e.g., pivotable) outer structure components 50. These outer structure components 50 may be configured as or otherwise include outer cowl doors 52. Each of these outer cowl doors 52 extends circumferentially about the centerline 34. In particular, each outer cowl door 52 extends circumferentially between an outer cowl upper end 54 and an outer cowl lower end 56. The outer cowl upper end 54 may be pivotally connected to the bifurcation structure 32 and/or the pylon 38 by, for example, one or more hinges. Each outer cowl door 52 is thereby operable to move (e.g., pivot) between a closed position (position of FIG. 2) and an open position (position of FIG. 3). Referring again to FIG. 2, the outer cowl lower ends 56 of the outer cowl doors 52 may be configured to latch together via one or more latches so as to at least partially or completely form, for example, a fan cowl and/or a translatable sleeve of the outer structure 24.

Figure 4:
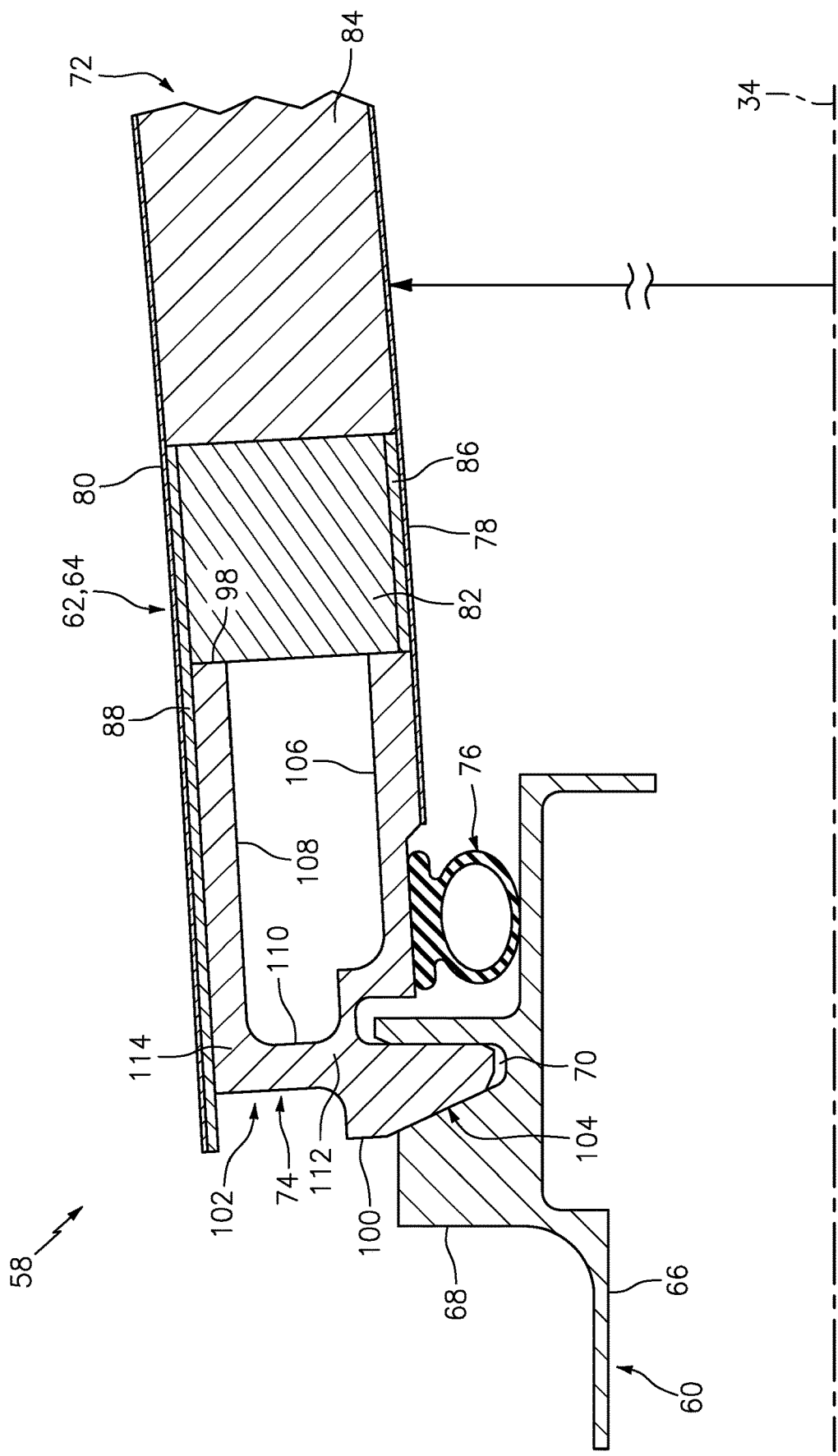
FIG. 4 is a side sectional illustration of an end portion of an assembly for the aircraft propulsion system.

FIG. 4 illustrates an end portion of an assembly 58 for the aircraft propulsion system 20. This aircraft propulsion system assembly 58 includes a fixed structure 60 and a moveable (e.g., pivotable) structure 62 such as a cowl door 64. This cowl door 64 may be configured as one of the inner cowl doors 44. Alternatively, the cowl door 64 may be configured as one of the outer cowl doors 52, or any other moveable structure included in the aircraft propulsion system 20; e.g., a fan cowl door.

The fixed structure 60 of FIG. 4 is configured as a turbine engine case. This fixed structure 60 includes a tubular (or arcuate) sidewall 66 which extend circumferentially about (or completely around) the centerline 34. The fixed structure 60 also includes a mount 68 with a receptacle 70 such as, but not limited to, a groove; e.g., a V-groove. This receptacle 70 of FIG. 4 projects partially radially into the mount 68. The receptacle 70 also extends circumferentially about the centerline 34 within, through or into the mount 68.

The cowl door 64 of FIG. 4 includes a structural panel 72, a cowl door mount 74 and a seal element 76; e.g., a fire seal element and/or a bulb seal element. The structural panel 72 includes a first (e.g., inner) skin 78, a second (e.g., outer) skin 80 and one or more cellular cores 82 and 84. The structural panel 72 of FIG. 4 also includes one or more reinforcement sheets 86 and 88.

Figure 5:
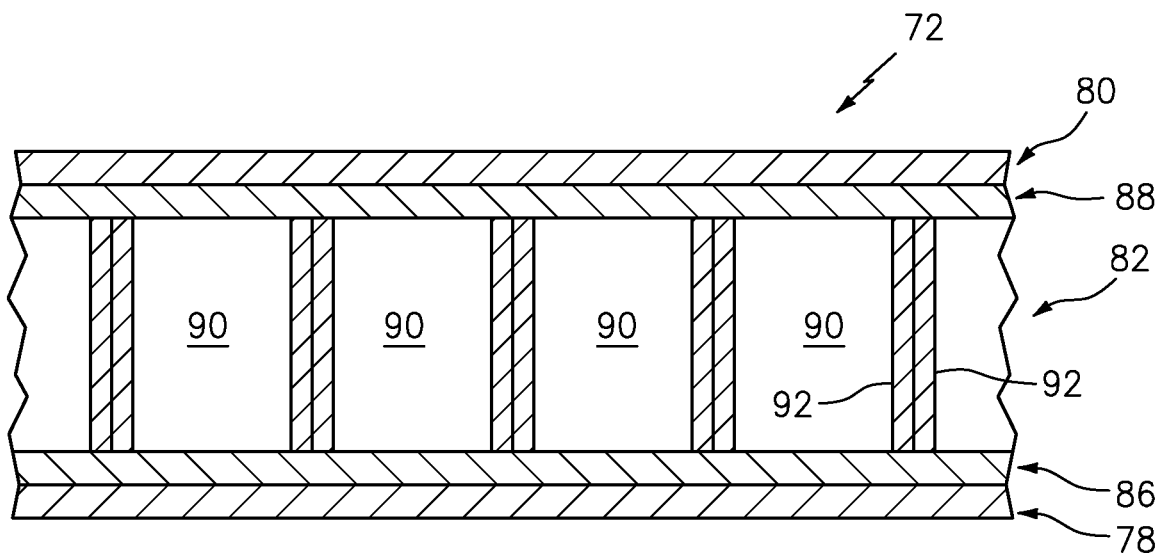
FIG. 5 is a side sectional illustration of a portion of a first cellular core configured within the end portion of the aircraft propulsion system assembly.
Figure 6:
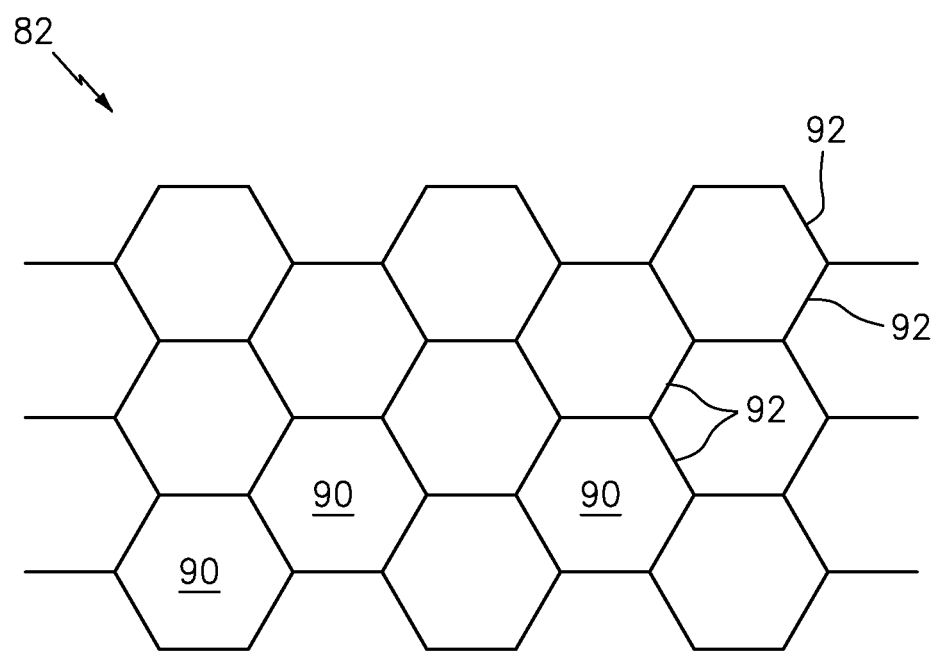
FIG. 6 is a side view illustration of a portion of the first cellular core.

Referring to FIGS. 5 and 6, the first cellular core 82 is configured to form one or more first cavities 90 (e.g., radially) between the first skin 78 and the second skin 80 and, more particularly, between the first (e.g., inner) reinforcement sheet 86 and the second (e.g., outer) reinforcement sheet 88. The first cellular core 82 of FIGS. 5 and 6, for example, is configured as a honeycomb core. This first cellular core 82 includes a plurality of corrugated first sidewalls 92. The first sidewalls 92 are arranged in a side-by-side array and connected to one another such that each adjacent (neighboring) pair of first sidewalls 92 forms an array of the first cavities 90 therebetween. Referring to FIG. 5, each of the first cavities 90 extends (e.g., generally radially) through the first cellular core 82 to and between the first reinforcement sheet 86 and the second reinforcement sheet 88. Referring to FIG. 6, each first cavity 90 may have a polygonal (e.g., hexagonal) cross-sectional geometry when viewed in a plane parallel to one or more of the elements 78, 80, 86 and/or 88 (see FIG. 5). The present disclosure, however, is not limited to any particular cellular core configurations. The present disclosure is also not limited to including reinforcement sheets. One or both of the reinforcement sheets 86 and 88, for example, may be omitted such that the first cellular core 82 is connected directly to the first skin 78 and/or the second skin 80.

Figure 7:
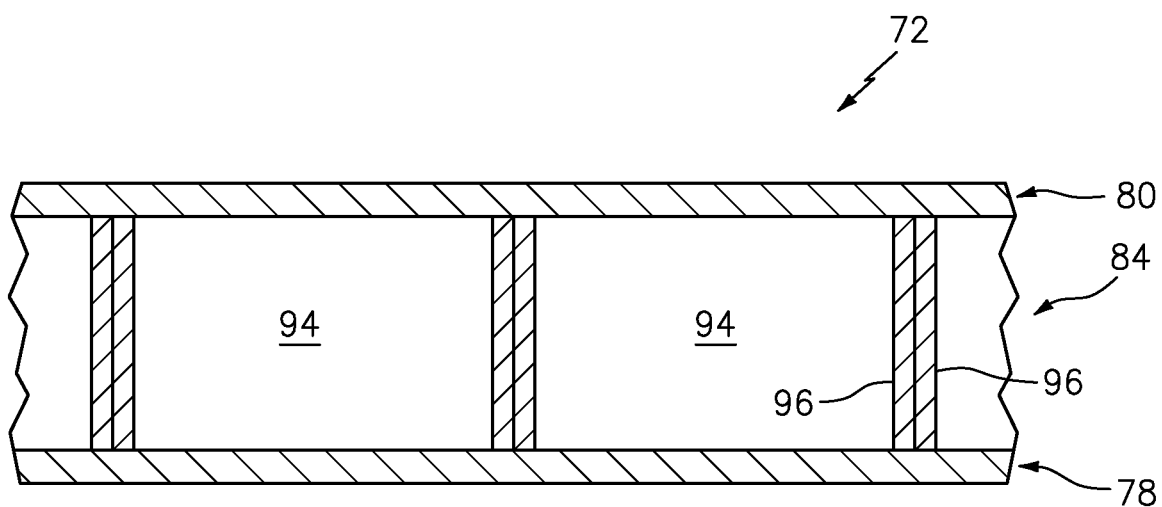
FIG. 7 is a side sectional illustration of a portion of a second cellular core configured within the end portion of the aircraft propulsion system assembly.
Figure 8:
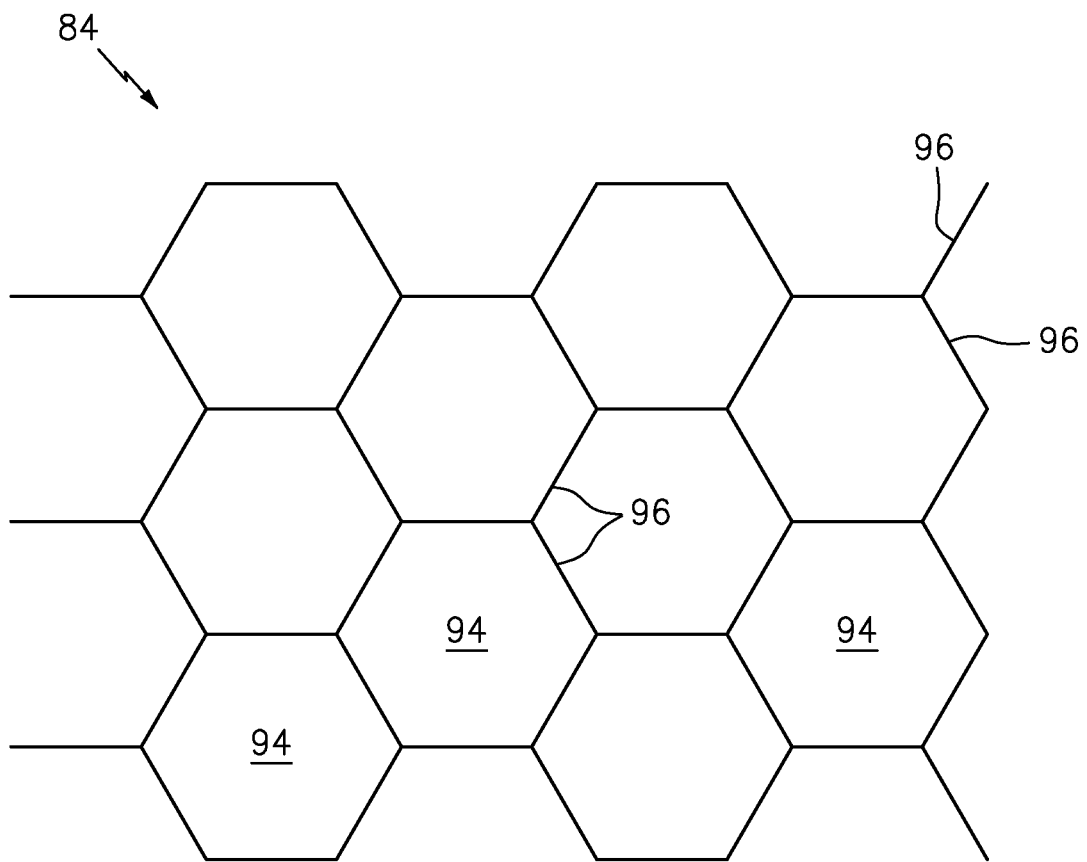
FIG. 8 is a side view illustration of a portion of the second cellular core.

Referring to FIGS. 7 and 8, the second cellular core 84 is configured to form one or more second cavities 94 (e.g., radially) between the first skin 78 and the second skin 80. The second cellular core 84 of FIGS. 7 and 8, for example, is configured as a honeycomb core. This second cellular core 84 includes a plurality of corrugated second sidewalls 96. The second sidewalls 96 are arranged in a side-by-side array and connected to one another such that each adjacent (neighboring) pair of second sidewalls 96 forms an array of the second cavities 94 therebetween. Referring to FIG. 7, each of the second cavities 94 extends (e.g., generally radially) through the second cellular core 84 to and between the first skin 78 and the second skin 80. Referring to FIG. 8, each second cavity 94 may have a polygonal (e.g., hexagonal) cross-sectional geometry when viewed in a plane parallel to one or more of the elements 78 and/or 80 (see FIG. 7). The present disclosure, however, is not limited to any particular cellular core configurations. The present disclosure is also not limited to embodiments where the second cellular core 84 is connected directly to the first skin 78 and the second skin 80. For example, in other embodiments, at least one reinforcement sheet may be arranged between the second cellular core 84 and the first skin 78 and/or at least one reinforcement sheet may be arranged between the second cellular core 84 and the second skin 80, for example, in a similar manner as described above with respect to the reinforcement sheets 86 and 88.

The first cellular core 82 of FIG. 6 has a first core configuration with a first density. The second cellular core 84 of FIG. 8 has a second core configuration with a second density. Here, the term "density" may describe a ratio of material to open space in a cellular core. For example, a cellular core with a relatively low density may be configured with smaller cavities than a cellular core with a relatively high density. In the embodiments of FIGS. 6 and 8, the first density of the first cellular core 82 is different (e.g., greater) than the second density of the second cellular core 84. The present disclosure, however, is not limited to such an exemplary embodiment.

Referring again to FIG. 4, the first cellular core 82 is arranged (e.g., axially) between and may be next to, adjacent and/or abutted against the second cellular core 84 and the mount 74. The first cellular core 82 is arranged (e.g., radially) between and connected to the first skin 78 and the second skin 80. More particularly, the first cellular core 82 is arranged between and connected (e.g., bonded/liquid interface diffusion (LID) bonded) to the first reinforcement sheet 86 and the second reinforcement sheet 88. The first reinforcement sheet 86 in turn is arranged between and connected (e.g., bonded/liquid interface diffusion (LID) bonded) to the first cellular core 82 and the first skin 78. Similarly, the second reinforcement sheet 88 is arranged between and connected (e.g., bonded/liquid interface diffusion (LID) bonded) to the first cellular core 82 and the second skin 80.

The second cellular core 84 is arranged (e.g., radially) between and connected (e.g., bonded/liquid interface diffusion (LID) bonded) to the first skin 78 and the second skin 80.

Figure 9:
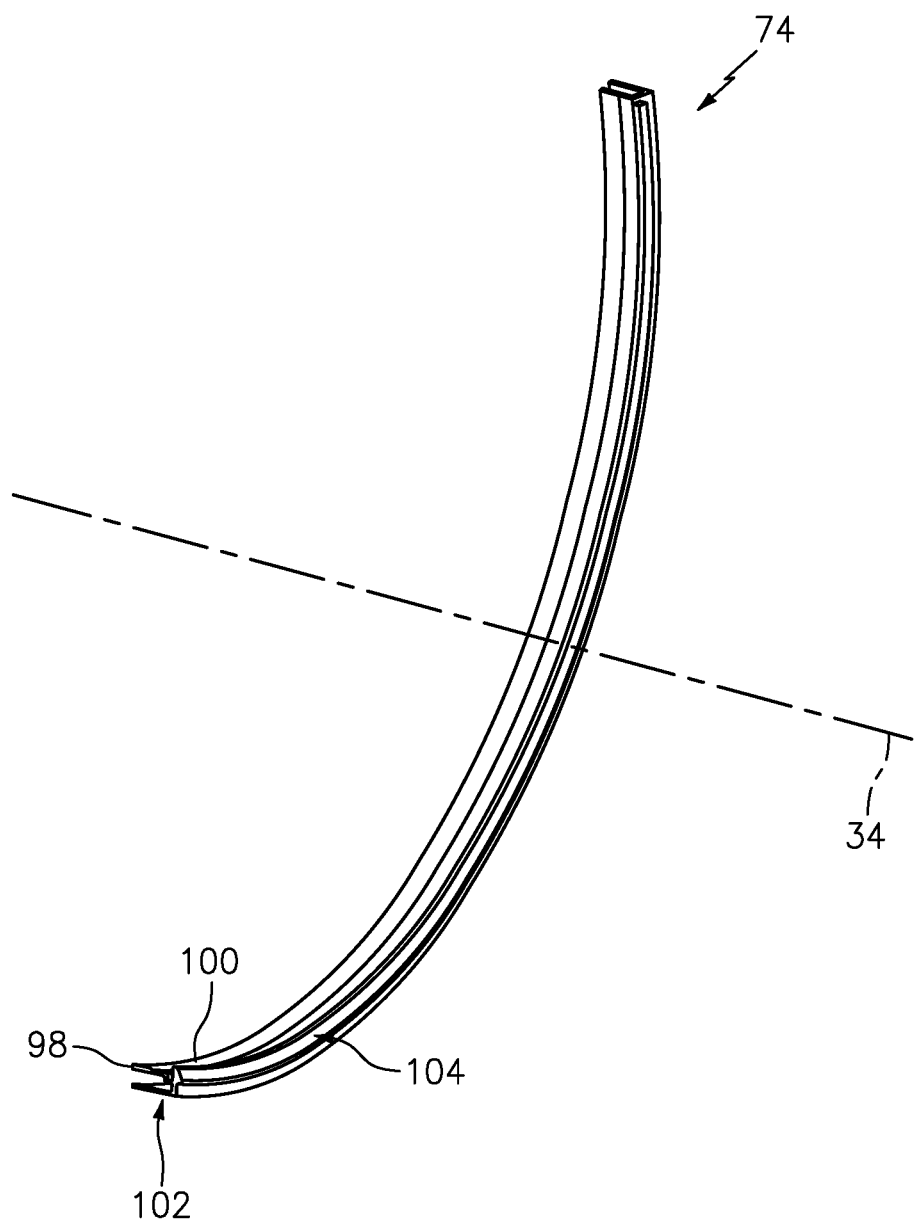
FIG. 9 is a perspective illustration of a door mount.
Figure 10:
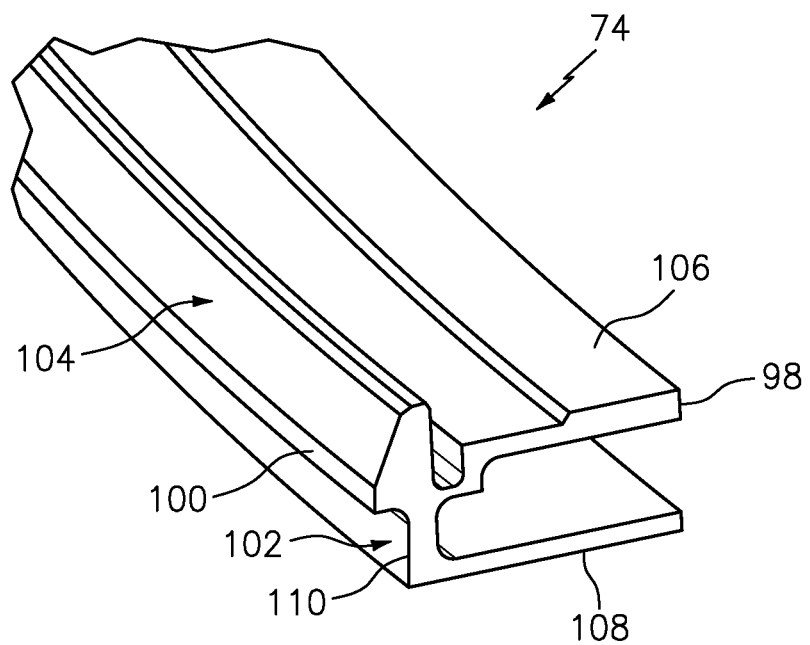
FIG. 10 is a perspective illustration of an end portion of the door mount.
Figure 11:
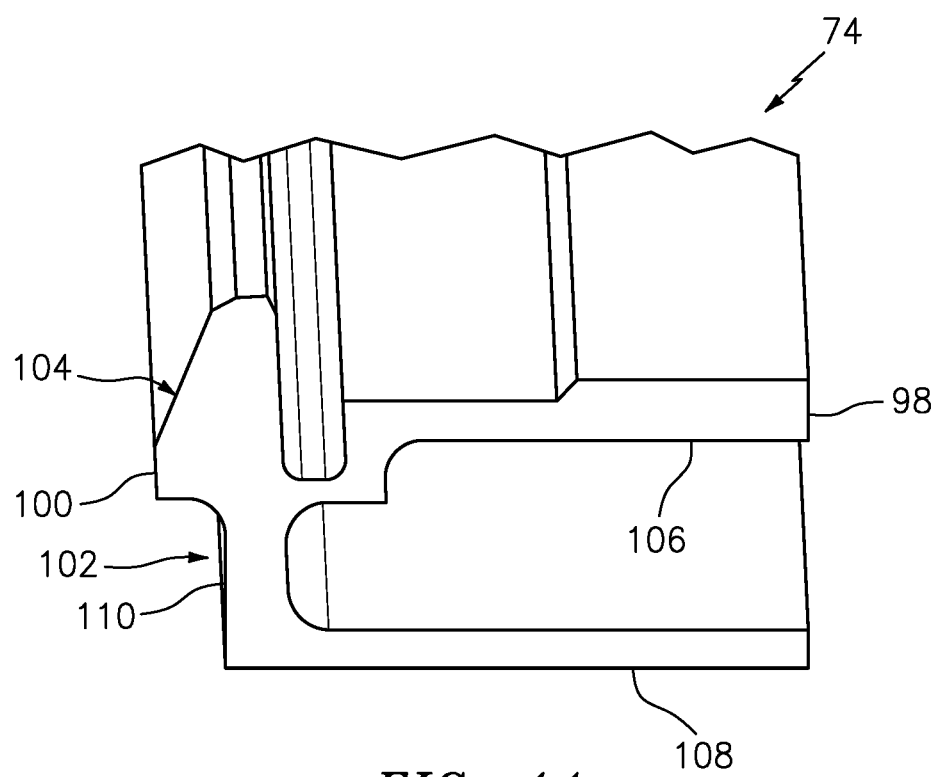
FIG. 11 is another perspective illustration of an end portion of the door mount.

Referring to FIGS. 9-11, the mount 74 may be configured as an arcuate body; e.g., an arcuate monolithic body. The mount 74 of FIG. 9, for example, extends circumferentially about the centerline 34. The mount 74 of FIG. 4 extends axially along the centerline 34 between an interior end 98 and an exterior end 100.

The mount 74 of FIGS. 4, 10 and 11 includes a base 102 and a coupler 104. The base 102 of FIGS. 4, 10 and 11 includes an arcuate first (e.g., inner) flange 106, an arcuate second (e.g., outer) flange 108 and an arcuate web 110. The web 110 extends (e.g., radially) between and is connected to the first flange 106 and the second flange 108. The web 110 may be located at (e.g., on, adjacent or proximate) the exterior end 100 of the mount 74. The first flange 106 projects (e.g., axially) out from a first (e.g., inner) end 112 of the web 110 in a first direction; e.g., towards the cores 82 and 84. The second flange 108 projects (e.g., axially) out from a second (e.g., outer) end 114 of the web 110 in the first direction.

The first flange 106 of FIG. 4 is (e.g., axially and circumferentially, partially) overlapped by the first skin 78. The first flange 106 is abutted (e.g., axially) against the first reinforcement sheet 86 and the first cellular core 82. The first flange 106 is connected (e.g., bonded/liquid interface diffusion (LID) bonded) to the first skin 78 using, for example, LID bonding foil.

The second flange 108 is (e.g., axially and circumferentially, completely) overlapped by the second skin 80 as well as the second reinforcement sheet 88. The second flange 108 is abutted (e.g., axially) against the first cellular core 82. The second flange 108 is connected to the second skin 80. More particularly, the second flange 108 is connected (e.g., bonded/liquid interface diffusion (LID) bonded) to the second reinforcement sheet 88. The second reinforcement sheet 88 is in turn between and connected (e.g., bonded/liquid interface diffusion (LID) bonded) to the second flange 108 and the second skin 80 using, for example, LID bonding foil.

Figure 13:
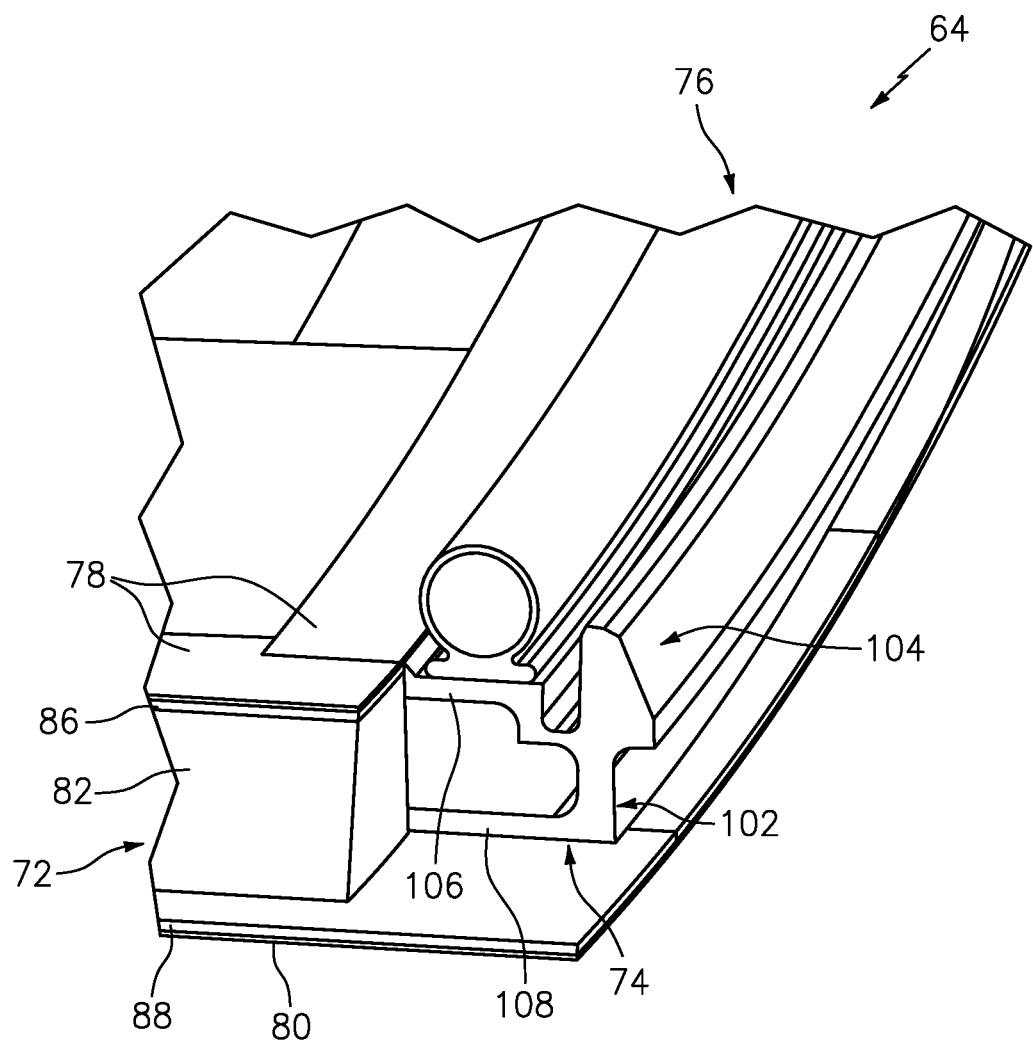
FIG. 13 is a perspective illustration of a portion of the cowl door.

The coupler 104 may be configured as an arcuate member such as, but not limited to, an arcuate flange; e.g., an arcuate V-blade (see also FIG. 13). The coupler 104 is position at the exterior end 100 of the mount 74 and/or a (e.g., axial) end of the cowl door 64. The coupler 104 projects (e.g., radially inward) from the base 102 and its first flange 106. The coupler 104 also projects (e.g., radially) away from the first skin 78 (see also FIG. 13). With this configuration and arrangement, the coupler 104 is operable to project (e.g., radially) into and mate with the receptacle 70. The coupler 104 may thereby reduce or prevent (e.g., axial) movement of the cowl door 64 relative to the fixed structure 60 when the cowl door 64 is in its closed position.

The seal element 76 is mounted to the first flange 106 (see also FIG. 13). The seal element 76 is configured to press (e.g., radially) against the fixed structure 60 so as to form a sealed interface between the fixed structure 60 and the cowl door 64.

Figure 12:
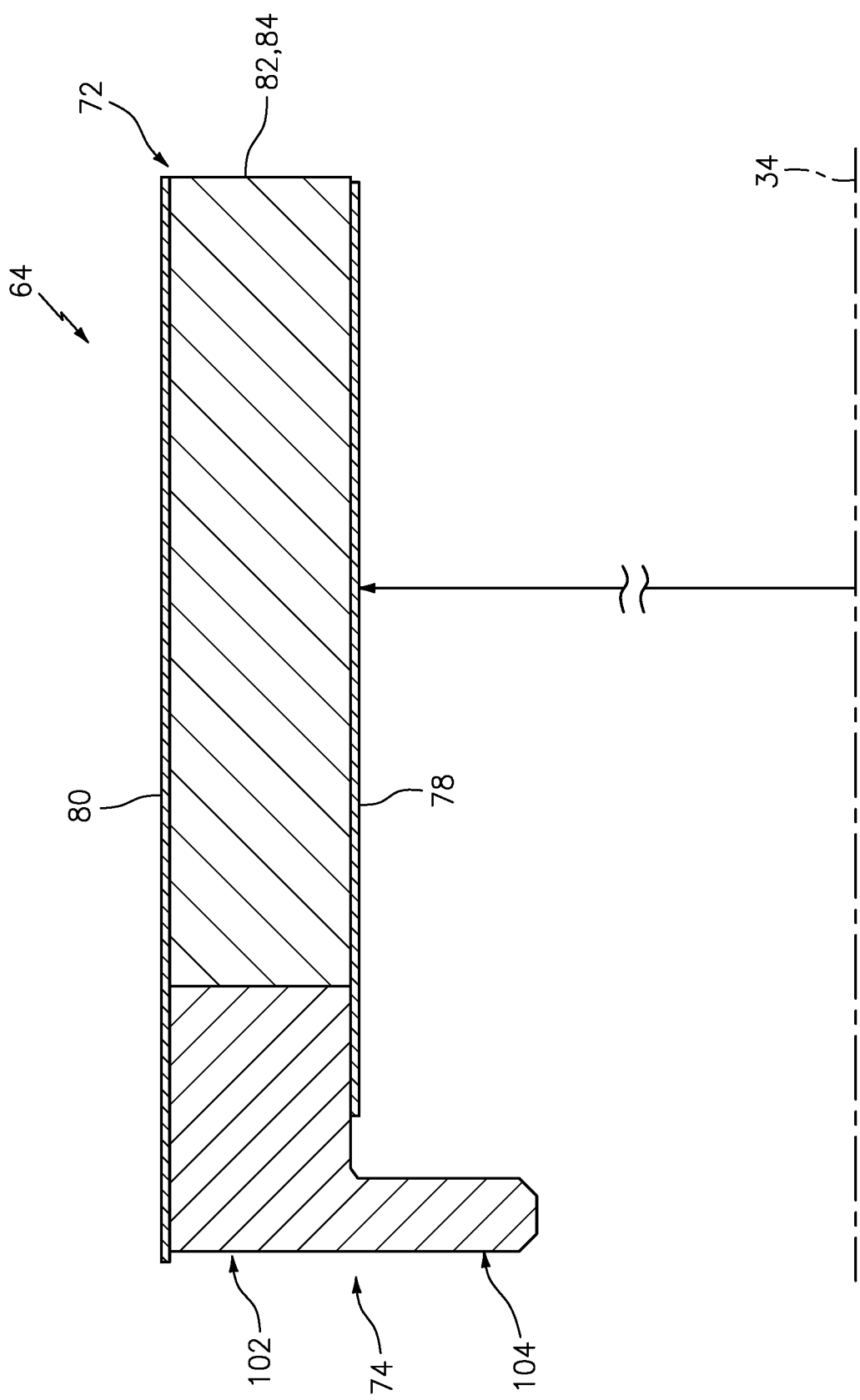
FIG. 12 is a side sectional illustration of an end portion of another assembly for the aircraft propulsion system.

In some embodiments, referring to FIG. 12, the cowl door 64 may be configured without the first reinforcement sheet 86 and/or the second reinforcement sheet 88.

In some embodiments, the cowl door 64 may be configured with a single cellular core; e.g., the core 82 or 84.

In some embodiments, the cowl door 64 may be configured without the seal element 76.

In some embodiments, one or more or each component 72, 74 of the cowl door 64 of FIGS. 4 and 12 may be constructed from or otherwise include metal such as, but not limited to, pure titanium (Ti) or titanium alloy.

In some embodiments, the base 102 may be configured as a solid body; e.g., without a channel defined between the flanges 106 and 108 (e.g., see FIG. 4).

In some embodiments, the cowl door 64 may be configured as an inner cowl door.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a cowl door movable between a closed position and an open position;
    the cowl door including a structural panel and a mount;
    the structural panel including an inner skin, an outer skin and a cellular core connected to and arranged between the inner skin and the outer skin;
    the mount comprising a base and a coupler, the base connected to and arranged between the inner skin and the outer skin, the coupler projecting out from the base, the coupler positioned at an axial end of the cowl door, and the coupler projecting radially inward from the base and away from the inner skin; and
    the mount configured as a monolithic body;
    wherein the outer skin axially overlaps the coupler; and
    wherein a gap is formed by and extends radially between a distal end of the coupler and a distal end of the outer skin.

2. The assembly of claim 1, wherein the cellular core is bonded to at least one of the inner skin or the outer skin.

3. The assembly of claim 1, wherein the cellular core comprises a honeycomb core.

4. The assembly of claim 1, wherein
    the cellular core comprises a first cellular core, and the structural panel further includes a second cellular core connected to and arranged between the inner skin and the outer skin; and
    the first cellular core is arranged between and is abutted against the second cellular core and the mount.

5. The assembly of claim 4, wherein
    the first cellular core has a first density; and
    the second cellular core has a second density that is different than the first density.

6. The assembly of claim 1, wherein the structural panel further includes at least one of
    an inner reinforcement sheet bonded to and arranged between the cellular core and the inner skin; or
    an outer reinforcement sheet bonded to and arranged between the cellular core and the outer skin.

7. The assembly of claim 1, wherein the structural panel comprises metal.

8. The assembly of claim 1, further comprising a reinforcement sheet bonded to and arranged between the base and one of the inner skin or the outer skin.

9. The assembly of claim 8, wherein the reinforcement sheet is further bonded to the cellular core.

10. The assembly of claim 1, wherein the mount comprises metal.

11. The assembly of claim 1, wherein the mount is bonded to at least one of the inner skin or the outer skin.

12. The assembly of claim 1, wherein the base has a generally U-shaped cross-sectional geometry.

13. The assembly of claim 1, wherein
    the base includes an inner flange, an outer flange and a web extending between and connected to the inner flange and the outer flange;
    the inner flange is overlapped by and connected to the inner skin; and
    the outer flange is overlapped by and connected to the outer skin.

14. An assembly for an aircraft propulsion system, comprising:
    a cowl door movable between a closed position and an open position;
    the cowl door including a structural panel and a mount;
    the structural panel including an inner skin, an outer skin and a cellular core connected to and arranged between the inner skin and the outer skin;
    the mount comprising a base and a coupler, the base connected to and arranged between the inner skin and the outer skin, the coupler projecting out from the base, and the coupler comprising an arcuate V-blade;
    the coupler positioned at an axial end of the cowl door, and the coupler projecting radially inward from the base and away from the inner skin; and
    the mount configured as a monolithic body;
    wherein the outer skin axially overlaps the coupler; and
    wherein a gap is formed by and extends radially between a distal end of the coupler and a distal end of the outer skin.

15. An assembly for an aircraft propulsion system, comprising:
    a cowl door movable between a closed position and an open position;
    the cowl door including a structural panel and a mount;
    the structural panel including an inner skin, an outer skin and a cellular core connected to and arranged between the inner skin and the outer skin;

the mount comprising a base and a coupler, the base connected to and arranged between the inner skin and the outer skin, and the coupler projecting out from the base;

the coupler positioned at an axial end of the cowl door, and the coupler projecting radially inward from the base and away from the inner skin; and the mount configured as a monolithic body; and a turbine engine case configured with a receptacle;

the coupler configured to project into and mate with the receptacle when the cowl door is in the closed position;

wherein the outer skin axially overlaps the coupler; and wherein a gap is formed by and extends radially between a distal end of the coupler and a distal end of the outer skin.

16. The assembly of claim 15, further comprising a seal element attached to the base and configured to press against the turbine engine case.

\* \* \* \* \*